Nov. 27, 1934.    G. LOWKRANTZ    1,982,216
SORTING MACHINE
Filed April 12, 1933    3 Sheets-Sheet 1

Nov. 27, 1934.　　　　G. LOWKRANTZ　　　　1,982,216
SORTING MACHINE
Filed April 12, 1933　　　3 Sheets-Sheet 2

INVENTOR-
Gunne Lowkrantz
BY
ATTORNEY-

Patented Nov. 27, 1934

1,982,216

UNITED STATES PATENT OFFICE 1,982,216

SORTING MACHINE

Gunne Lowkrantz, Endicott, N. Y., assignor, by mesne assignments, to International Business Machines Corporation, New York, N. Y., a corporation of New York Application April 12, 1933, Serial No. 665,656

11 Claims. (Cl. 209—110)

REISSUED

This invention relates to record controlled machines in general and particularly to controlling means for such machines.

The primary object of the invention is to provide novel and improved controlling means for record controlled machines. While for convenience of description the invention will be described hereinafter as embodied in a machine adapted to sort perforated accounting and statistical control records, the invention is not to be considered as limited to use in the specific type of machine selected for purposes of illustration, but is capable of general use in the art of constructing accounting and statistical machines. As will appear later herein, the characteristics of the invention are such as to admirably adapt it for use in various types of perforated record controlled machines to control machine instrumentalities other than sorting mechanism or elements. For instance, it may be used to control the counter magnets or class selection magnets of a tabulating machine in accordance with the perforations in the control records or cards, or it may be used in perforating machines responsive to record control.

A specific object is to provide novel and improved controlling means for sorting machines which has the characteristics of faster operation, greater reliability, and accuracy of operation in spite of possible poor contact of the analyzing brushes, simplicity of construction, and avoidance of carefully designed mechanical parts necessary in prior machines to avoid the harmful effects of inertia and excessive wear commonly present in sorting machines having complicated mechanical movements.

Another object is to provide controlling means for the elements or instrumentalities of record controlled machines which permits the use of smaller perforations to designate the data recorded on the control records thereby enabling more data to be recorded without sacrificing the mechanical strength of such records or, if no increase in capacity of the records is desired, permitting greater strength to be had, these benefits being obtained with the same or greater degree of accuracy and reliability of performance of the machine as has been secured heretofore.

A more specific object is to provide means for controlling elements or instrumentalities of record controlled machines which takes advantage of the grid control characteristics of conventional types of thermionic valves to practically eliminate flow of current in the analyzing brush circuits of record controlled machines thereby avoiding numerous troubles such as burning of the analyzing brushes, the contact roll, and the record due to arcing at the analyzing brushes which arcing has been found to be very destructive in electrically controlled accounting and statistical machines using perforated control records.

Another specific object is to provide controlling means for record controlled accounting and statistical machines which utilizes the discharge of a periodically charged condenser to control the elements or instrumentalities of such machines thereby enabling the quantity of electrical energy used in each control operation to be accurately controlled and limited to the minimum quantity necessary for successful operation of each of the elements or instrumentalities controlled. By this utilization of the discharge of a condenser to control a machine element the evils of burning of the brushes and so on, mentioned above, as well as others not specifically mentioned, may be eliminated entirely.

Still another object is to provide controlling means for machines of the type described which permits the use of alternating current without requiring the use of a motor generator or like apparatus.

Various other objects, advantages or features of the present invention will be particularly pointed out in the following specification and claims or will be obvious after a study thereof and of the accompanying drawings.

Figure 1:
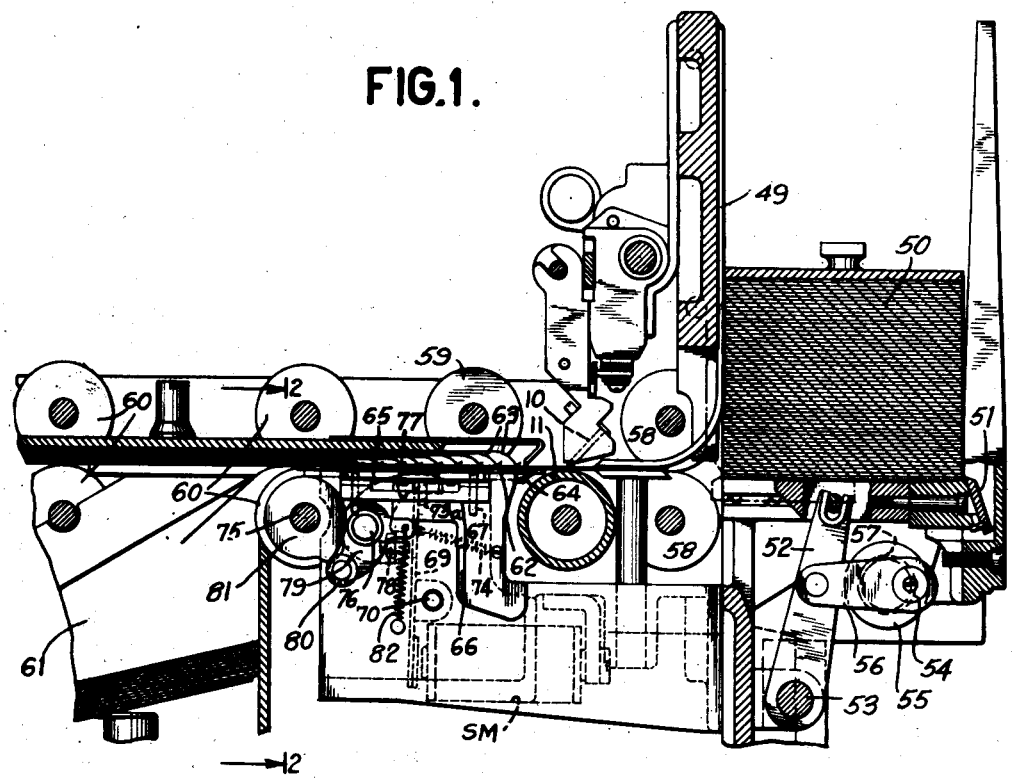
Fig. 1 is a vertical longitudinal section of a portion of a sorting machine.

One of the biggest problems in the construction of record controlled accounting and statistical machines is to increase the speed of existing types of such machines to enable a greater quantity of work to be obtained and to secure the desired data more quickly. Equally important is the problem of reducing or entirely eliminating, if possible, damage due to arcing at the analyzing brushes which is produced when a perforation in the controlling record is sensed by said brushes which damage, in most cases, consists in burning the brushes themselves or the contact cooperating with the brushes or even the edges of the perforation. In extreme cases, all three kinds of damage may result.

The present invention aims to solve both of these major problems in a very simple manner preferably by taking advantage of the characteristics of thermionic valves and electrical condensers as will appear later.

The problem of arcing at the brushes has been wholly or partially solved in present types of record controlled machines by providing a number of moving parts synchronized with the analyzing of the records, such as commutators or impulse distributors, arcing contacts, and so on. These additional moving parts require careful initial adjustment and constant care to keep them in operating condition. As will be explained later herein, the present invention has certain characteristics which permit complete elimination of these moving parts with a consequent simplification of the circuits and mechanical parts of the machine.

The speed at which various operations are performed in record controlled machines is usually limited by such factors as inertia and the effects of friction at high speed resulting in wear and problems in lubrication in the case of mechanically operated machines and in addition the effects of inductance of the magnets and circuits in the case of electrically operated machines. The latter type of machine is probably the fastest of all due to the greater simplicity of the mechanism but, as the various functions are performed by magnets in most cases, the effects of inductance may limit the speed of the various controls and operating elements or instrumentalities.

Sorting machines of the electrically controlled type are simple in construction and operation and, since the sorting function is usually controlled by a single magnet, a sorting machine has been selected as perhaps the simplest type of record controlled machine which may be used to illustrate the invention to be described hereinafter. Accordingly, the sorting machine described in Letters Patent No. 1,741,985 will be used in the following description so far as may be necessary to furnish a suitable background or setting. It is to be understood, however, that the invention can be applied to many types of record controlled machines and is not limited in application to the particular machine selected for purposes of illustration or even to sorting machines in general.

The general mechanical details and operation of the sorting machine described in the above patent are now familiar to those skilled in the art and, since few mechanical changes have been made therein, the mechanical structure need not be described in great detail herein but will be described briefly only to make the present description complete. Since many of the changes are principally matters of design only, and the general operation of the mechanical parts is the same as in the patent, this part of the description may be safely taken up last herein.

Figure 3:
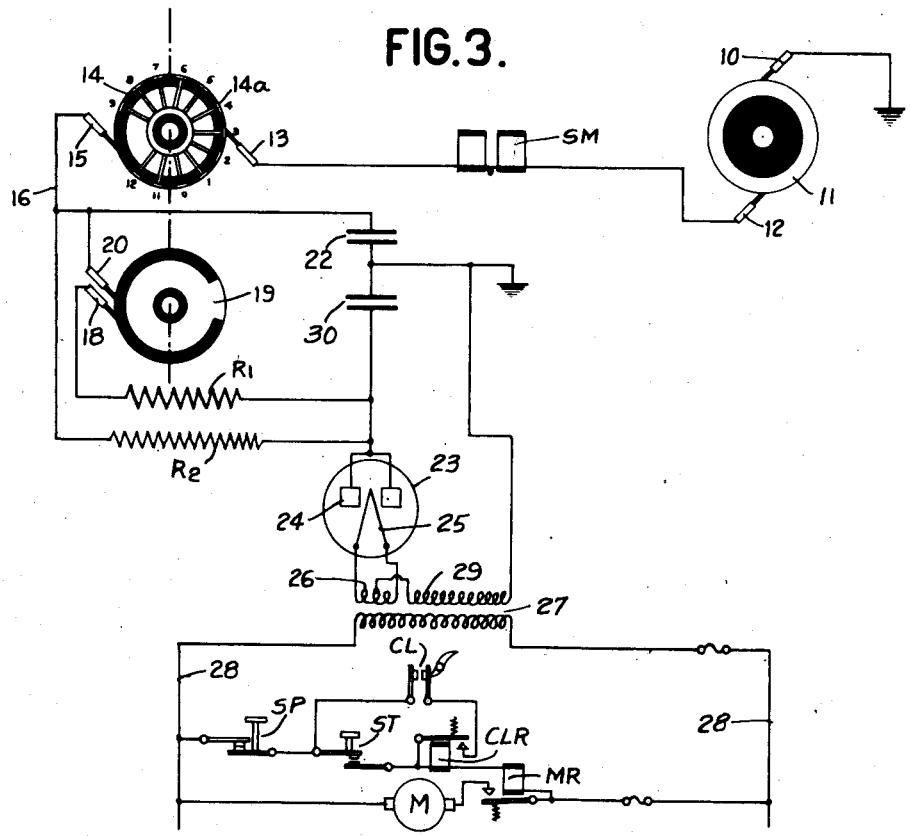
Fig. 3 is a circuit diagram of a preferred form of embodiment of the invention.

The circuit diagram Fig. 3 illustrates one form of embodiment in a sorting machine and is preferred because it is simplest and has been found by experience to be reliable. The usual sorting magnet is designated SM in Fig. 3 and, as in the patent mentioned above, controls the passage of the perforated records between appropriate guide blades leading to the usual twelve pockets corresponding to the twelve index-point positions of the well known Hollerith perforated record card.

The magnet SM is energized once each cycle if and when a hole is sensed by the main sorting or analyzing brush 10 to cause the card in which the hole appears to be guided by one of the guide blades to the appropriate pocket. As usual, there may be provided a thirteenth pocket to receive those cards which have no hole in the column sensed by the brush 10.

Figure 5:
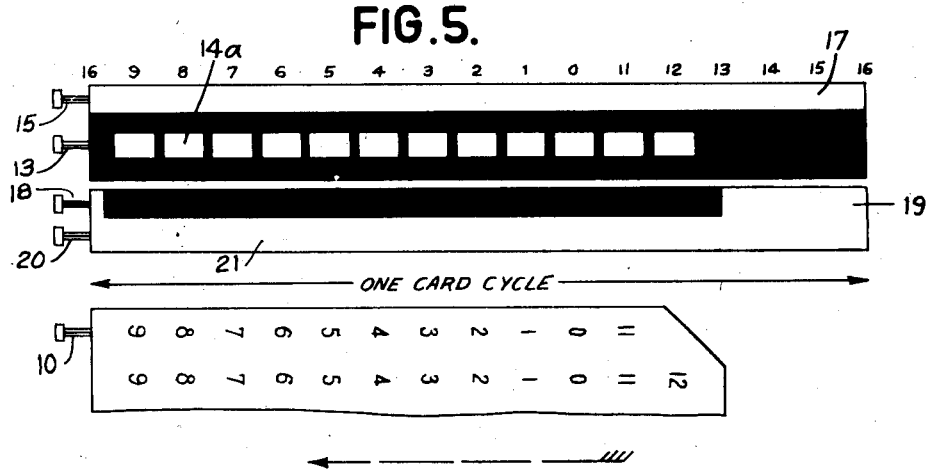
Fig. 5 is a diagram showing the timing of the commutator shown in Fig. 3.

The latter is preferably grounded to the machine frame and coacts with the usual contact roll 11 having a fixed common brush 12 to which is connected one end of the winding of sorting magnet SM. The other end of the winding of magnet SM is connected, through a brush 13, to the usual selecting commutator 14 described in detail in Patent No. 1,741,985. The commutator 14 has the customary common brush 15 by which the commutator is connected to a bus wire 16 (see Fig. 5 also). There are twelve spots of conducting material 14a on the commutator 14 each corresponding to one of the twelve index-points in the record card columns and so designated by small numerals in Figs. 3 and 5, and each spot 14a can be made conducting to the common ring with which brush 15 coacts as described in the aforesaid patent. The common ring is designated 17 in Fig. 5 which illustrates the timing of the commutator with respect to the analysis of the card.

The commutator 14 is provided with an additional brush 18 and segment 19 which preferably is formed as part of the common ring 17 but for convenience will be treated here as if it were a separate commutator entirely and provided with a common brush 20 connected to the bus wire 16 and a continuous contact ring 21 of which the segment 19 is part. In actual practice the commutator 14 is so constructed that the brushes 15, 20 and common rings 17, 21 are replaced by a single brush and single common ring, respectively.

The function of the commutator segment 19 cooperating with brushes 18, 20 is to control the charging of a condenser 22 once each card cycle through a charging resistance $R_1$ which in a successfully operated machine was of the order of 2000 ohms. For this purpose the resistance $R_1$ is connected to the brush 18 and to a source of direct current which may comprise a thermionic rectifier 23 commonly known in the electrical art as a type "—80" full-wave rectifier, the two plates 24 of the rectifier 23 being connected in common to the resistance $R_1$ as shown in Fig. 3. The filament 25 of the rectifier tube 23 is heated by current supplied by a secondary coil 26 of a transformer 27 the primary coil of which is connected to the supply wires 28 leading to a source of alternating current. The transformer 27 may be of a type now well known and commonly used in radio receiving apparatus in connection with type "—80" rectifiers and has a secondary coil 29 for supplying the necessary current to charge the condenser 22, one end of the coil 29 being connected to an equalizing tap to the mid-point of coil 26 while the other end is connected to condenser 22 and also grounded through the machine frame. A second condenser 30 is connected between the condenser 22 and the common connection to the plates 24. A second resistance $R_2$ which may be of the order of 15,000 ohms is connected between the bus wire 16 and the common connection to plates 24.

The commutator segment 19 is so proportioned and timed that current can flow from bus wire 16, through brushes 18, 20, the commutator segment 19, and resistance $R_1$, to the plates 24 only during the period in each cycle comprised between the point just after the brush 13 has left the "12" spot 14a (Fig. 5), corresponding to the "12" index-point position of the card, and the point just before the brush 13 contacts with the "9" spot, corresponding to the "9" index-point position of the card.

The purpose of this arrangement is to charge the condenser 22 in the periods between the analyses of the cards, that is, when the brush 10 is not sensing the index-point positions of a card but is on the bare contact roll or on the leading and trailing edges of the card. During this period the brush 13 will be insulated as will be readily seen from an inspection of Fig. 5.

The usual control circuits of the sorting machine motor M may be connected between the line wires 28. Except for the fact that in the present case, it is preferable to provide the sorting machine with an alternating current motor and alternating current motor control relays, the motor control circuits may be identical with the circuits disclosed in Patent No. 1,741,985. When the start key ST is depressed current flows from left hand line wire 28 (Fig. 3) through the usual stop key SP, start key ST, card lever relay CLR, and motor relay MR to the right hand line wire 28, thus causing the contacts of the card lever relay CLR and motor relay MR to close, starting the motor M. When cards begin to pass the brush 10, the usual card lever contacts CL close setting up a holding circuit for relays CLR and MR as usual. The machine will stop if the key SP is depressed or the contacts CL open due to the exhaustion of the cards from the magazine. Obviously any suitable scheme of connections may be used for control of motor M, the one shown being selected for illustration only.

The operation of the machine when connected as in Fig. 3 will now be explained in detail.

When the line wires 28 are connected to the source of current by closing a suitable switch (not shown), condenser 30 will be charged to a potential determined by the constants of the rectifier circuit. This potential is applied to condenser 22 through either both resistances $R_1$, $R_2$ in parallel or resistance $R_2$ alone, depending on whether or not the machine stopped in a position where current can flow through segment 19. In either case, the result will be to charge the condenser 22 to its full capacity so that by the time the key ST is depressed to begin sorting of records, the circuits will be in condition to control the disposition of the first card.

When the sorting brush 10, in its analysis of a card, senses a hole, the condenser 22 will discharge through the commutator 14 and the sorting magnet SM over a circuit traced as follows: Ground, condenser 22, brush 15, commutator 14, through the spot 14a corresponding to the hole in the card, brush 13, the sorting magnet SM, brush 12, contact roll 11 and sorting brush 10 through the hole in the card, to ground. This causes the sorting magnet SM to control the destination of the card in which the hole occurs exactly as in Patent No. 1,741,985.

The constants of the circuit, such as the voltage to which condenser 22 is charged and the electrical characteristics of the winding of the sorting magnet SM, are so chosen that practically the entire charge of the condenser 22 is dissipated through the magnet SM after the brush 10 contacts with the contact roll 11 through the hole in the card and before said brush leaves the hole so that there can be no arc formed between the brush 10 and contact roll 11 due to the breaking of the circuit when the brush leaves the hole. The only flow of current which is likely to be broken by the brush 10 is that passing through resistance $R_2$ but, since the latter has a high value allowing only a negligible amount of current to flow, no arc can be caused by this current.

The sorting magnet SM is designed to have a relation between its resistance and inductance such as to enable the condenser 22 to discharge aperiodically through the magnet. Under this condition the energy stored in condenser 22 will be transferred to the magnet SM in the shortest possible time. The initial voltage applied to magnet SM by condenser 22 is high enough to minimize the effect of self induction in the magnet SM which causes the magnetic field to build up more rapidly than in circuits used in prior sorting machines of the same type. The resistance $R_2$, the primary function of which will be described later herein prevents an excessive current from flowing through magnet SM from the rectifier during the time the condenser is discharged through magnet SM. It is true, of course, that the potential applied to magnet SM by the condenser 22 is high and may equal the charging voltage furnished by the rectifier 23 but the current through magnet SM falls rapidly as the condenser 22 discharges and, as the energy stored in condenser 22 is comparatively small, the heating effect on the magnet is negligible. When the condenser 22 is of the order of 4 microfarads, the magnet SM will operate in from .0005 to .001 seconds time, which is a much faster action than could be secured from the control magnets of previous machines.

In practice, it has been found possible to considerably prolong the life of the type "—80" rectifier 23 by so proportioning the coil 26 or by tapping it at such a point as to supply current to the filament 25 at a potential of three volts instead of five volts, the standard filament voltage used in operating type "—80" rectifiers. This prevents excessive wasting away of the filament of the rectifier without in any manner affecting the successful operation of the circuit.

Obviously, a rectifier of any suitable type and capacity, whether full-wave or half-wave, could be used equally as well. The type "—80" is usually quite cheap in comparison with other types and due to the reduced filament current lasts a considerable length of time. For that reason the type "—80" is preferred but is not essential. The use of the "—80" tube in the manner described in conjunction with a condenser to supply the operating impulse to the sorting magnet SM, together with the elimination of the costly and wasteful motor generator usually necessary for operation of sorting machines of the electrically controlled type, results in a great economy of current and a saving in the cost of operation of each sorting machine in use.

In case it is necessary to operate the sorting machine from a source of 25 cycle alternating current it may be found more satisfactory to replace the half-wave rectifier circuit with a full-wave circuit in order to insure a sufficient number of charging impulses for the condenser 22. This would make it necessary to reconnect the full-wave rectifier 23 to operate in the normal way as a full-wave rectifier. These changes, however, are within the skill of the electrician and need not be explained in detail herein.

The high resistance $R_2$ also prevents the condenser 22 from losing its charge due to gradual leakage caused by the low conductivity which is a natural characteristic of any condenser, in case it is necessary to stop the machine during the sorting of a batch of cards and allow the machine to remain idle for a short time with a card under the sorting brush but with no hole at the index-point position on which the brush may be resting. The resistance $R_2$ allows a potential to be applied to the condenser 22 just sufficient in value to keep the latter fully charged so that, after the machine is restarted, the condenser will be charged sufficiently to operate the sorting magnet SM when the hole is sensed in the particular card on which the sorting brush rested.

The resistance $R_2$ permits a certain amount of current to flow through brush 10 in addition to that produced when the condenser 22 discharges but the value of this additional current is so small that its interruption is not accompanied by an arc and is quite harmless. The condenser 30 may be of the order of .5 microfarads. It acts to smooth the pulsations of current delivered by the rectifier 23 and produces a slightly more uniform charging potential. It corresponds roughly to the well-known filter commonly used in power supply units of radio receiving apparatus but, since in this case there is no hum problem, so important in the construction of radio receiving apparatus, a more refined treatment of the current supplied by the rectifier 23 is unnecessary and useless.

It is possible to completely eliminate flow of current in the circuit of the sorting brush or at least reduce its value to such negligible amount as to be undetectable except by instruments of high sensitivity, which absolutely eliminates arcing at the sorting brush without affecting in any way the speed or reliability of operation of the circuit just described. This may be accomplished by taking advantage of the grid control characteristics of well known types of thermionic valves to control the sorting magnet SM. This control is effected, as will appear hereinafter, by connecting the grid element of any one of several well known types of three element thermionic valves to the sorting brush 10 for the purpose of applying a negative potential to the grid each time a hole is sensed by said brush thereby causing a reduction in the flow of current in the plate circuit. The sorting magnet SM is controlled through this change in the current flow in the plate circuit.

Due to the type of coupling between the sorting brush and the thermionic valve, the flow of current through the hole in the card is prevented or reduced to an infinitesimal value which is harmless. This method of control possesses all the advantages of the circuit of Fig. 3, namely, higher speed of operation and elimination of arcing at the sorting brush, and in addition results in successful operation of the sorting magnet even with very poor contact of the sorting brush with the contact roll. While the grid control method now to be described in detail may be employed in conjunction with a circuit in which a discharging condenser operates the sorting magnet, and such is the preferred manner of its use, it is also possible, and in some cases may be found more desirable, to employ the grid control method without the discharging condenser. It is desired to point out herein that the condenser method and the grid control method may be used together or either alone may be used to advantage, their use alone or in combination depending upon circumstances. Each separately and both together constitute individual improvements in the art of constructing record controlled machines and will be so claimed hereinafter.

Figure 4:
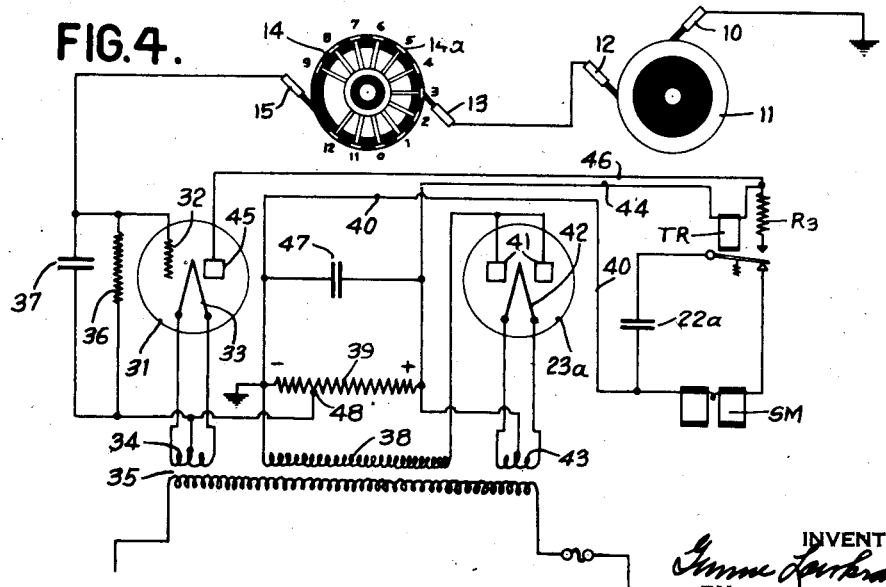
Fig. 4 is a circuit diagram of another form of embodiment of the invention.

Fig. 4 illustrates diagrammatically the method of control of the sorting magnet SM by the sorting brush 10 through the grid of a conventional type of three element thermionic valve, sometimes termed a triode tube. Several types of such valves or tubes are available and the one designated 31 in Fig. 4 may be of the type known in the electrical art as type "—71 A". The type "—12 A" tube or similar tube will also serve equally as well.

The grid 32 of the valve 31 is connected to the common brush 15 of the commutator 14 while the brush 13 (which, it will be recalled, cooperates with the spots 14a of commutator 14) is connected, in this particular embodiment of the invention, directly to the common brush 12 of the contact roll 11. The sorting brush 10 is, as before, grounded to the machine frame. The filament 33 of the thermionic valve 31 is heated by a secondary coil 34 of a transformer 35, the primary coil of which is connected to the same source of alternating current as the driving motor, as in Fig. 3. The transformer coil 34 is tapped at its mid-point and connected to the grid 32 through a grid leak resistance 36 in parallel with which may be a condenser 37.

The transformer 35 has a secondary coil 38, the left hand end of which (Fig. 4) is grounded to the machine and connected to one end of a potential dividing resistance 39 and also, through a wire 40, is connected to the winding of the sorting magnet SM. The other end of the coil 38 is connected to both plates 41 of a full wave rectifier tube 23a, the filament 42 of which is heated by a secondary coil 43 of transformer 35. The mid-point of coil 43 is connected to the right hand end of the potential dividing resistance 39 and also to one terminal of the coil of a trip relay TR over a wire 44. The plate 45 of the thermionic valve 31 is connected by a wire 46 to the other terminal of the coil of relay TR and also to one end of a charging resistance $R_3$ (corresponding in function to the resistance $R_1$ in Fig. 3). The other end of the resistance $R_3$ is connected to one of the two fixed contacts of the trip relay TR. The other fixed contact of relay TR is connected to the sorting magnet SM while a condenser 22a (corresponding in function to the condenser 22, Fig. 3) is connected between the wire 40 and the movable contact of trip relay TR.

A condenser 47 is connected in parallel with the potential dividing resistance 39 for the purpose of smoothing the half-cycle pulsations of the full wave rectifier 23a which, as in Fig. 3, is here functioning as a half-wave rectifier. At a suitable point the resistance 39 is tapped as at 48 and connected to the mid-point of coil 34, and the point at which the tap is made is so chosen that at the required time a negative potential may be applied to the grid 32 sufficient in value to reduce the plate current in wire 46 to a point low enough to allow the relay TR to release its armature and cause the sorting magnet SM and condenser 22a to be connected in a closed series circuit through the contacts of the trip relay TR.

The grid resistance 36 may be of the order of several megohms and serves to maintain the grid at substantially filament potential at all times except when a negative potential is applied to the grid through the hole in a card as will appear later herein.

The operation of the circuit just described will now be explained in detail.

When the switch (not shown) is closed to connect the primary of transformer 35 to the source of alternating current, the filament 42 of the rectifier tube 23a will heat sufficiently to apply a positive potential to plate 45 of the thermionic valve 31. When sufficient plate current is produced, the trip relay TR will attract its armature thereby connecting the positive or right hand end of the potential dividing resistance 39 to the condenser 22a through wire 44, relay TR, and the charging resistance R3. By the foregoing action sufficient potential will be applied to said condenser to charge it fully.

The usual start key (ST in Fig. 3) may now be depressed and, as a result, the first card will be fed under the sorting brush 10. When the latter senses a hole in the card, the grid 32 will be connected directly to the point 48 of the stabilizing resistance 39 through the ground which is in this case, the machine frame. The circuit thus set up by the brush 10 extends from grid 32, brush 15, a commutator spot 14a, brushes 13, 12, contact roll 11 and brush 10 through the hole in the card; the ground, left-hand portion of resistance 39, to the point 48. As a consequence thereof a negative potential will be applied to the grid 32 sufficient in value to wholly or partly neutralize the effect of the positive potential applied to the plate 45 and cause the relay TR to release its armature. The condenser 22a and the sorting magnet SM will thus be connected in a closed circuit through the contacts of relay TR with the result that the condenser 22a will discharge through the sorting magnet SM and cause the latter to attract its armature. The attraction of the sorting magnet armature in this manner affects the sorting mechanism exactly as is the case in the circuit of Fig. 3 to determine the disposition of the card.

The foregoing action occurs between the time the brush 10 enters the hole in the card and the time said brush leaves the hole and, on the latter event, the negative potential previously applied to the grid 32 will be removed again permitting normal current to flow in the plate circuit. It is clear that, when the negative potential is removed, relay TR will again attract its armature causing the condenser 22a to be again connected to the charging resistance R3, resulting in recharging of the condenser 22a in readiness for the analysis of the next card.

The grid leak resistance has a relatively high value sufficient to ensure that the grid will be maintained at substantially filament potential except at the time when a hole in a card under brush 10 sets up the circuit from the resistance 39 to the grid through the brush 10. The condenser 37 is useful for the purpose of keeping the grid negative for a predetermined period after the brush 10 has left the hole in the card in case this contact duration is less than that required for the trip relay TR and magnet SM to operate fully. The negative potential applied when the brush 10 senses a hole in a card charges condenser 37. When the brush 10 leaves the hole in the card, the condenser 37 discharges through resistance 36 at a rate dependent upon the capacity of the condenser and the value of the grid leak resistance 36, the rate of discharge of condenser 37 being relatively slower than the rate of discharge of condenser 22a due to the high value of resistance 36. Thus, whenever necessary, the relay TR can be maintained in a deenergized condition for a predetermined period after the brush 10 has left the hole in the card thereunder. The provision of the condenser 37 ensures reliable action of the sorting magnet SM and trip relay TR even at extremely high speeds of the machine as, by varying the size of the aforesaid condenser, the grid may be maintained negative for an appreciable length of time after the brush 10 leaves the hole in the card.

The condenser 37 need not be provided in all machines but is useful when very high sorting speeds are desired and/or extremely small perforations are to be used to designate data in the records to be sorted. When the foregoing conditions exist, the duration of contact of the sorting brush 10 through perforations in the records may be so short as to prevent full operation of trip relay TR and magnet SM. It then becomes necessary to hold the relay TR deenergized long enough to permit condenser 22a to discharge. The use of the condenser 37 under such circumstances is a simple and effective expedient for avoiding the use of auxiliary devices such as holding relays or commutators which would otherwise be necessary to accomplish the desired result.

As an illustration, it may be assumed that the brush 10 makes contact through a hole in a card for .001 second. By providing a condenser 37 of proper capacity, it is possible to maintain the trip relay TR in deenergized condition for periods .010 to .015 seconds or even longer, the actual time being determined by the period necessary for condenser 37 to discharge through resistance 36.

It may happen in commencing sorting operations, say on beginning the day's work, that the machine stopped after a previous sorting operation at a point in which the brush 13 rests on one of the spots 14a, let us say the "3" spot. Since at this time no card has been moved under the brush 10, the negative potential will be gradually applied to the grid 32 through the bare contact roll 11 as the valve 31 heats, hence the full plate current will not be attained and the relay TR will not be energized sufficiently to attract its armature and charge the condenser 22a in readiness for analysis of the first card. This action will cause no harm, however, as the timing of the feed rolls and card picker are such that a card will not naturally be advanced far enough from the magazine to bring the leading edge thereof under brush 10 until the commutator has completed the previous unfinished cycle by moving from the "3" position to the "12" position. Thus, before the leading edge of the first card touches the brush 10 (at about the 16th point in the cycle, Fig. 5), the brush 13 will have moved on the relatively long insulated portion of the commutator 14 between "12" of the one cycle and the "9" of the next cycle, there being no spots 14a provided on this portion of the commutator. This action will cause the relay TR to be fully energized to charge condenser 22a, as described, before a possible "9" hole in the first card is sensed.

The mechanical features of the machine are quite similar to those of the machine described in Patent No. 1,741,985, therefore, only a brief description will be given here mainly for sake of completeness.

The usual card magazine 49 (Fig. 1) receives the perforated record cards 50 which are to be sorted, the latter ordinarily being placed in the magazine face down with the long edge adjacent the "9" index-point positions (Fig. 5) to the left (Fig. 1) so that the "9" positions are sensed first and the "12" positions last. The usual horizontally reciprocable card picker 51 is provided for removing the cards from the magazine 50 one at a time and is actuated by slotted arms like 52 (Fig. 1) fixed to a rock shaft 53 which is oscillated once each card cycle by a crank pin 54 on a disc 55 through the medium of a link 56 pivoted to both crank pin 54 and one of the arms 52 as shown in Fig. 1. The disc 55 is fixed to a shaft 57 which is driven at the rate of one revolution per card cycle by suitable gearing (not shown).

A card removed from the magazine by the operation of picker 51 is brought between suitable feed rolls 58 also driven by the motor M and carried to the left (Fig. 1) by the rolls 58 far enough for similar feed rolls 59 to grip the card and further advance the latter to the left. Other feed rolls 60 similar to feed rolls 58, 59 carry the card to the appropriate sorting pocket.

Figure 2:
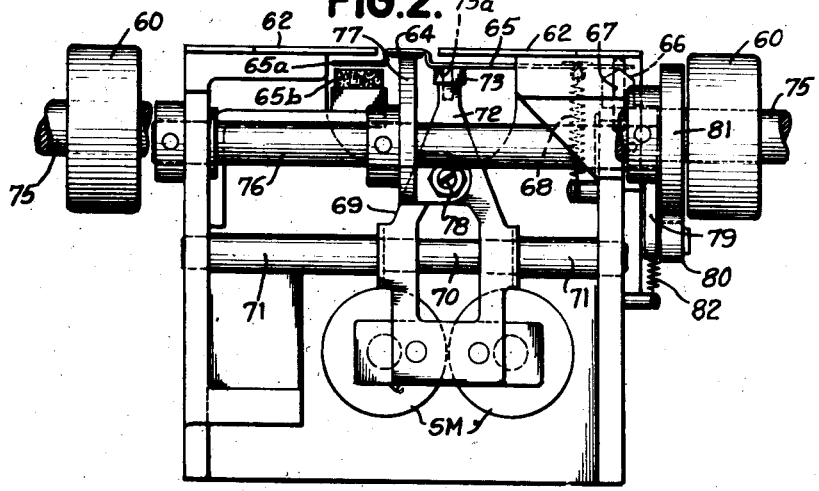
Fig. 2 is a transverse vertical section on the line 2—2 in Fig. 1.

Only one of the sorting pockets, the "Reject" pocket, is designated 61 in Fig. 1. In its passage to the left (Fig. 1) between feed rolls 58, 59 the card first passes between the contact roll 11 and sorting brush 10 and then passes over a pair of parallel fixed plates 62 spaced a short distance apart (Fig. 2) and also passes underneath the guide blades 63. The latter lead to the several sorting pockets as usual, and are narrowed at their right-hand ends (Fig. 1) sufficiently to permit them to drop into the space between the plates 62 when necessary.

The narrowed ends of the guide blades 63 are turned up as shown in Fig. 1 to permit a card fed by rollers 58, 59 to pass freely between the plates 62 and the guide blades. Normally the upturned blade ends rest on top of a channel or bent portion 64 formed in a horizontal plate 65 which is pivotally mounted at one end (the right-hand end, Fig. 2) on knife edges formed in a block 66 fixed in the main frame. Pins 67 carried by block 66 and projecting through holes in the plate 65 slightly larger in diameter than the pins 67 serve to prevent the plate 65 from slipping off the knife edges. A spring 68 interposed between the plate 65 adjacent the block 66 and a fixed stud normally tends to draw the plate downwardly but such movement is prevented by a latch plate 69 pivoted by ears formed therein to a cross shaft 70 in the main frame, spacing tubes 71 on the shaft 70 keeping the latch plate in its proper position near the center of shaft 70. The upper end of the latch plate 69 is tapered to form a narrow tongue 72 upon which rests a block 73 secured to the underside of the plate 65 thereby holding the latter in the position shown in Fig. 2 in which position the upper surface of the channel 64 is barely level with the upper surfaces of plates 62.

A spring 74 attached to the latch plate 69 above the shaft 70 normally urges the latch plate in a clockwise direction (Fig. 1) and holds the latch plate in the position shown in that figure. A stop pin 73a which may also serve to rivet the block 73 to plate 65, prevents the upper end of the latch plate 69 from being drawn by spring 74 too far to the right (Fig. 1) out of engagement with block 73. Adjacent the lower end of the latch plate 69 is mounted the sorting magnet SM hereinbefore mentioned.

The plate 65 has a lug 65a formed therein which extends to the left (Fig. 2) and cooperates with a buffer 65b of yielding material which construction makes the operation of the plate 65 as quiet as possible.

Adjacent the latch plate 69, between the latter and a shaft 75 carrying feed rolls 60, is a shaft 76 rotatably mounted in the main frame and extending parallel with the shaft 75. The shaft 76 has integral therewith a gooseneck shaped arm 77 curving upwardly and to the right (Fig. 1) into the channel 64 so as to underlie the plate 65. This arm 77 has an offset lug which carries an adjusting screw 78 extending to the right (Fig. 1) toward the latch plate 69. The shaft 76 also carries on its front end (Fig. 1) an arm or cam follower 79 provided with a roller 80 cooperating with a cam 81 fixed to shaft 75. A spring 82 attached to an ear in the cam follower 79 tends to hold the roller 80 always on the periphery of the cam.

The operation of the above parts should be fairly obvious when the construction described is compared with the construction in Patent No. 1,741,985. The parts are so timed that, as the analyzing brush 10 senses a given index-point position, the left or leading edge of the card will be just under the sorting blade 63 which leads to the sorting pocket corresponding to that particular index-point position. If a hole is present in, say the "3" index-point position, the magnet SM will be energized at this time in either of the ways described before herein causing the upper end of the latch plate 69 to move to the left (Fig. 1) under the influence of magnet SM, permitting the plate 65 to drop assisted by its spring 68 and lowering all blades 63 to the left of that leading to the "3" pocket which latter blade will be held up by the card. At this time the card overlies the plates 62, 65 and is beneath the blade leading to the "3" pocket and all others to the right (Fig. 1). Consequently, the card having the "3" hole will be guided towards the "3" pocket and will be carried along to said pocket by the feed rolls 60.

The cam 81 is so timed that, after the "12" or last index-point position of any card has been sensed and before the "9" index-point position of the next card is sensed, said cam will rock the cam follower 79, shaft 76, and arm 77 in a counterclockwise direction (Fig. 1) thereby raising the plate 65 to the position of Fig. 1 in which position the latch plate 69 will be drawn by its spring 74 into latching position beneath the block 73. The adjusting screw 78 serves to give the latch plate 69 a slight push in case the latter should stick to the poles of the magnet SM due to residual magnetism and ensures the proper restoration of the latch plate to latching position. As shown in Fig. 1, the cam 81 has just finished the restoration of the plates 65, 69 and the parts are in readiness to begin a new cycle of operations.

It has been stated that the invention is not limited to use in sorting machines but also may be used for other purposes, among them being the control of the counter magnets of a tabulating machine. In order to make clear how this can be done, Fig. 6 illustrates in simple diagrammatic fashion an embodiment of the invention in an elementary form of Hollerith type tabulating machine to secure quicker action in adding amounts represented by perforations in the cards and/or permit the use of very small holes for representing the data.

The Hollerith tabulating machine is now well known in the art. Its basic principles of operation are explained very clearly in Patent No. 945,236 to Herman Hollerith while a specific and more improved form is described in detail in Patent No. 1,822,594. For these reasons, the manner in which the present invention may be incorporated in a tabulating machine will be explained very briefly herein and has been illustrated in the drawings in as simple and diagrammatic form as possible.

Figure 6:
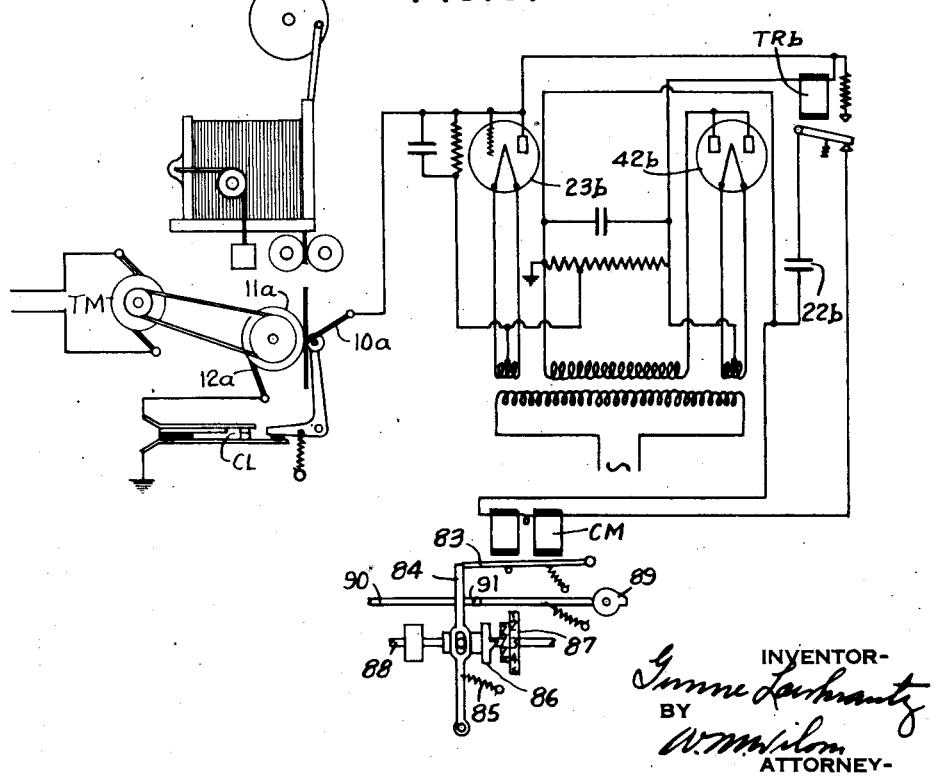
Fig. 6 is a circuit diagram of still another form of embodiment of the invention.

The letters TM in Fig. 6 indicate the usual tabulating motor (designated by the reference numeral 12 in the Hollerith patent aforesaid). This motor is in operation as long as cards are being fed under the analyzing brushes but stops when the cards are exhausted in much the same fashion as the sorting machine. The control circuits for the motor TM are not shown in the drawings as they are not involved herein and may take any desirable form. Only one analyzing brush designated 10a is shown in Fig. 6 and corresponds in function to any of the brushes 15, 16, 17 in the Hollerith patent. The contact roll 11a cooperates with the analyzing brush 10a in the usual fashion to sense data designating holes in the card and is provided with a common brush 12a which may be grounded to the machine frame through card lever contacts CL. The letters CM designate one of the well known counter magnets such as the magnets 35, 36, 37 in the Hollerith patent or the magnets 98 in Patent No. 1,822,594.

The brush 10a is connected to a circuit which may be identical with that of Fig. 4 except that the selecting commutator 14 is not necessary in the tabulating machine and has been omitted while the magnet SM has been replaced by the counter magnet CM. The thermionic valves 23b and 42b function to control the trip relay TRb exactly like those shown in Fig. 4.

Whenever the brush 10a encounters a hole in the card passing thereunder, a negative potential will be applied to the grid of the thermionic valve 23b, as described before herein, thereby causing trip relay TRb to release its armature and effect energization of the counter magnet CM by discharge of the condenser 22b. As a result a spring restored latch 83 operated by the magnet CM will be disengaged from the free end of a spring operated clutch shifter 84 permitting a spring 85 to draw the clutch shifter 84 to the right, or clockwise (Fig. 6), until teeth on the clutch member 86 engage coacting teeth on a counter wheel 87. The latter is loose on a shaft 88 to which is splined the clutch member 86. The shaft 88 is driven by the motor TM through any suitable connections as gears, chains, or belts so as to make one complete revolution in the period of time required for the brush 10a to sense all the ten index-point positions from "9" to "0" to name them in the order in which they are sensed by the brush 10a. There are ten teeth on the counter wheel 87 to correspond with the ten positions from "9" to "0". Just after the "0" position is sensed by brush 10a, suitable means, as a cam 89 and a bar 90 carrying a pin 91 cooperating with the clutch shifter 84, becomes operative to disengage all operated clutches and relatch their shifters. As a result of the sensing of the holes in the cards and the operations controlled thereby, amounts will be accumulated on counter wheels 87 according to the value of each hole and this will take place exactly as in the usual Hollerith machine.

One of the important advantages of the grid control type of circuit whether embodied in a sorting machine as in Fig. 4 or in a tabulating machine as in Fig. 6 is that the use of the grid control permits very small holes to be used to designate data. Indeed, holes may be used which are little larger than pin holes and will reliably control the sorting magnet, counter magnet, or other element of such machines. It has been found by actual experiment that the circuits will function successfully even with a resistance of several hundred thousand ohms in series with the brush 10 (Fig. 4). It is clear, therefore, that reliable operation will be realized even with extremely poor contact of the analyzing brush 10 through a hole in a card.

The use of the grid control circuit of Fig. 4, with or without the condenser discharge circuit of Fig. 3, results in the elimination of a large number of arc preventing contacts, impulse distributors, and commutators which have been found necessary in prior record controlled machines to prevent arcing at the analyzing brushes. For instance, the contacts T—4, T—5, and 92 of Patent No. 1,882,766 could be eliminated completely and the counter circuits and brush circuits greatly simplified besides eliminating a large number of moving parts which have been found to require careful adjustment and constant careful attention to keep in working order. The trip relays TR (Fig. 4) and TRb (Fig. 6) never have to break any appreciable amount of current or do much work hence they may be very lightly constructed and faster in operation than would be the case if they were required to interrupt currents of appreciable value or perform any great amount of work.

The invention has been illustrated and described as embodied in a number of specific forms and types of machine, however, it is not limited to the forms of embodiment and types of machine selected for illustration but is of general application and can be modified as to details to suit the conditions of each problem of application. For these reasons, it is not desired to limit the scope of the following claims to the specific embodiments and machines described herein and illustrated in the drawings.

What is claimed is:

1. In a record controlled machine, sorting mechanism including an electromagnetic device for controlling the sorting mechanism, an electrical condenser adapted to operate the electromagnetic device by discharging through the latter, and a sorting brush responsive to data designations in a controlling record for causing the discharge of the condenser.

2. In a record controlled machine, a thermionic valve including a grid, a plate, a source of unidirectional current normally maintaining both grid and plate at a positive potential, a machine control element responsive to variations in current to the plate induced by variations in potential of the grid, means for analyzing data designations in successively presented records and operative in the sensing of a data designation to change the grid potential and means connected to the grid for maintaining the grid at the changed potential for a predetermined period of time after sensing of a data designation has taken place.

3. In combination, a sensing brush adapted to sense data designating holes in records momentarily presented to said brush, a machine operating element to be controlled in accordance with said holes, an electromagnet having a low impedance winding adapted to permit a rapid magnetization of said magnet, and a capacitor for operating said magnet, said capacitor having a magnitude sufficient to discharge through said magnet in the space of time in which the brush cooperates with a hole in the record, said capacitor having a connection to the sensing brush for causing the discharge of the capacitor on the occurrence of a data designation in a record presented to said brush.

4. A sorting machine comprising sorting mechanism, a magnet having a low impedance winding for controlling the sorting mechanism, a record sensing brush adapted to sense data designating holes in records momentarily presented to said brush, a capacitor for operating said magnet and controlled by said brush in accordance with the location of said holes in the records, said capacitor having a magnitude sufficient to fully operate said magnet in the space of time during which the brush is in a hole in a record.

5. In a record controlled machine, a machine control element, a record sensing brush adapted to explore the surface of records presented thereto to detect data designating perforations therein, said brush and a record cooperating therewith being moved relative to each other to effect exploration of the record, a magnet adapted to be fully operative to control said element in the brief space of time in which a perforation in the record may be cooperating with said brush, and a capacitor controlled by said brush and connected to said magnet, said capacitor having a magnitude sufficient to operate the magnet in the brief space of time during which the brush cooperates with a hole in the record.

6. A sorting machine comprising sorting mechanism including a sorting magnet, a condenser adapted by its discharge to operate the sorting magnet, a sensing brush for analyzing data designations in accounting and statistical records continuously presented thereto and operative on the sensing of a data designation in any record to connect the condenser to the sorting magnet, a source of current for charging the condenser, a device for connecting the energy source to the condenser to charge the latter during the intervals between records, and a device for preventing discharge of current from said source through said brush when the latter senses a designation in a record.

7. A sorting machine comprising means for feeding records in succession, a sorting brush for sensing designations in said records, sorting mechanism including a sorting magnet, a condenser having sufficient capacity to operate the sorting magnet, said sorting brush, sorting magnet and condenser together forming a series circuit whereby the sensing of a designation by the sorting brush causes the condenser to discharge through said brush and sorting magnet to operate the latter, and a device for charging the condenser prior to beginning the sensing of each record.

8. A sorting machine comprising sorting mechanism including a sorting magnet, a condenser adapted by its discharge to operate the sorting magnet, a sorting brush for sensing successively the records of a batch passed through the machine and active on the sensing of a data designation in one of the records to discharge the condenser through the sorting magnet, and a device for recharging the condenser between analyses of records.

9. A record controlled accounting and statistical machine comprising means for feeding perforated records in succession, a card reading element adapted to sense data designating holes in the records, a magnet of low impedance adapted to be operated in accordance with a hole sensed by the card reading element, a condenser adapted to operate said magnet by discharging current at an initially high potential through said magnet, said card reading element causing the condenser to discharge and operate the magnet when said card reading element encounters a data designating hole in a record.

10. A system for operating accounting and statistical machines by means of alternating current comprising a source of alternating current, a thermionic rectifier, a record analyzing element for sensing data designating holes in successively presented accounting and statistical records, an operating magnet for controlling machine operations in accordance with the data designating holes sensed by the analyzing element, a condenser adapted to be charged by the output from the rectifier and when discharged to operate the magnet at a high speed and connections whereby the analyzing element discharges the condenser when said element encounters a hole in a record analyzed by said element.

11. In a machine controlled by accounting and statistical record cards, a series circuit including a sensing element adapted by contact with successively presented cards to sense differentially disposed data designations in said cards, a machine control magnet for controlling the machine in accordance with designations sensed by the sensing element, and a condenser adapted to operate the magnet by discharging through the latter, the sensing element operating as a switch to connect the condenser to the magnet when a data designation is encountered by said element; and an auxiliary circuit for charging the condenser, including a source of current and a switching device effective to recharge the condenser in the intervals between analyses of cards.

GUNNE LOWKRANTZ.